United States Patent
Shimura

(10) Patent No.: US 6,994,196 B2
(45) Date of Patent: Feb. 7, 2006

(54) SYNCHRONIZING SPRING AND SYNCHRONIZING MECHANISM

(75) Inventor: Yasunari Shimura, Aichi (JP)

(73) Assignees: Aichi Machine Industry Co., Ltd., Aichi (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/399,719

(22) PCT Filed: Aug. 10, 2001

(86) PCT No.: PCT/JP01/06968

§ 371 (c)(1),
(2), (4) Date: Apr. 17, 2003

(87) PCT Pub. No.: WO02/33278

PCT Pub. Date: Apr. 25, 2002

(65) Prior Publication Data

US 2004/0026204 A1    Feb. 12, 2004

(30) Foreign Application Priority Data

Oct. 18, 2000  (JP) .............................. 2000-317929

(51) Int. Cl.
F16H 23/06 (2006.01)

(52) U.S. Cl. ................................. 192/53.343; 74/339

(58) Field of Classification Search .......... 192/53.343, 192/53.341, 53.34, 53.36
See application file for complete search history.

(56) References Cited

U.S. PATENT DOCUMENTS

| | | | | |
|---|---|---|---|---|
| 2,221,899 A | * | 11/1940 | White et al. | 192/53.343 |
| 2,221,900 A | * | 11/1940 | White et al. | 192/53.343 |
| 2,478,355 A | * | 8/1949 | Auten | 192/53.343 |
| 3,080,028 A | * | 3/1963 | Kennedy | 192/53.343 |
| 3,618,724 A | * | 11/1971 | Oehl | 192/53.343 |
| 3,631,952 A | * | 1/1972 | Sugimoto et al. | 192/53.342 |
| 4,828,087 A | * | 5/1989 | Kudo et al. | 192/53.34 |
| 5,269,400 A | * | 12/1993 | Fogelberg | 192/53.34 |

* cited by examiner

Primary Examiner—Saul Rodriguez
(74) Attorney, Agent, or Firm—Donald S. Dowden; Cooper & Dunham LLP

(57) ABSTRACT

The object of the present invention is to provide a synchro-spring to be used in a synchronizing mechanism having insert-shifting keys. Said synchro-spring is characterized by shaping convex forms in the portions which come into contact with said insert-shifting keys, and when this synchronizing mechanism is used for an automobile transmission, an enough capacity of the synchronizer ring can be ensured without increasing the size of the synchronizing mechanism, and smooth gear shifting is attained, and then excellent operability can be acquired.

1 Claim, 5 Drawing Sheets

1 : Synchronizing mechanism    4 : Insert-shifting keys
6 : Synchro-springs

SYNCHRONIZING SPRING AND SYNCHRONIZING MECHANISM

FIELD OF THE INVENTION

This invention relates to a synchro-spring and a synchronizing mechanism.

BACKGROUND OF THE INVENTION

A synchronizing mechanism (1) having insert-shifting keys (4,4) comprises an input shaft (2) which is a spline shaft, a synchro-hub (3) which is put on said input shaft (2) and has a plural number of key attachment notches (31,31) on the outer surface, insert-shifting keys (4,4) which are fitted into said key attachment notches (31,31) of said synchro-hub (3), a coupling sleeve (5) which is slidably put on said synchro-hub (3) and has three key fitting recesses (51,51) formed on said coupling sleeve's (5) inner surfaces to fit said insert-shifting keys (4,4) therein, synchro-springs (6,6) which act to guide said insert-shifting keys (4,4) toward said coupling sleeve (5), a synchronizer ring (7) which is put on said input shaft (2) adjacent to said synchro-hub (3) and has a boss part (70) which has a cone shaped inner surface (71), and a synchronized gear (8) which is put on said input shaft (2) adjacent to said synchronizer ring (7) and has a boss part (80) which has a cone shaped friction surface (81) on the outer surface contacting with the inner surface (71) of said synchronizer ring (7).

Hitherto, for example, C-shaped synchro-springs (6A,6A) which are shown in FIG. 7 and FIG. 8 have been provided as said synchro-springs (6,6). Said C-shaped synchro-springs (6A,6A) are fitted into grooves (32,32) which are formed on the both sides of said synchro-hub (3), and are deformed elastically to contact with spring holding recesses (41,41) which are formed on the inner part of said insert-shifting keys (4,4), so that said C-shaped synchro-springs (6A,6A) act to guide said insert-shifting keys (4,4) toward said coupling sleeve (5).

However, in the prior art described above, $d_1$ should be larger than $d_2$ ($d_1 > d_2$) to contact said synchro-springs (6,6) with spring holding recesses (41,41) of said insert-shifting keys (4,4) certainly, wherein $d_1$ is a radius of grooves (32,32) of the synchro-hub (3), $d_2$ is a distance from the inner surface of spring holding recesses (41,41) of the insert-shifting keys (4,4) to the center of the shaft before sliding of said coupling sleeve (5), $d_3$ ($<d_2$) is a distance from the inner surface of said insert-shifting keys (4,4) to the center of the shaft after sliding of said coupling sleeve (5), $d_4$ is a radius of the outer surface of the key groove (72) of the synchronizer ring (7), and $d_5$ is the effective radius (average radius) of the inner surface (71) of said synchronizer ring (7). Further, $d_3$ should be larger than $d_4$ ($d_3 > d_4$) to keep a space between the inner surface of said spring holding recesses (41,41) of said insert-shifting keys (4,4) and the outer surface of said key grooves (72,72) of said synchronizer ring (7). And further, $d_4$ should be larger than $d_5$ ($d_4 > d_5$) to ensure the strength of said synchronizer ring (7). Accordingly, a large $d_5$ cannot be settled, so that it is difficult to ensure a enough capacity of the synchronizer ring.

DISCLOSURE OF THE INVENTION

To solve said problems of the prior art, the present invention provides a synchro-spring (6) used in a synchronizing mechanism (1) having a plural number of insert-shifting keys (4,4), which is characterized by shaping convex forms respectively in the portions which come into contact with said plural number of insert-shifting keys (4,4).

Said synchro-spring (6) is preferably used for a synchronizing mechanism (1) of an automobile transmission. And further, the present invention provides a synchronizing mechanism (1) comprising a synchro-hub (3) put on an input shaft (2), insert-shifting keys (4,4) attached on the outer surface part of said synchro-hub (3), a coupling sleeve (5) slidably put on said synchro-hub (3), and said synchro-springs (6,6) which act to guide said insert-shifting keys (4,4) toward said coupling sleeve (5).

In the present invention, by shaping convex forms in the portions of said synchro-springs (6,6) which corn into contact with said insert-shifting keys (4,4), $d_2$ can be settled to be larger than $d_1$ ($d_1 < d_2$), so that $d_2$ and $d_3$ can be settled to be more larger, and then, $d_4$ and $d_5$ can be settled much larger as shown in FIGS. 2 and 3.

BRIEF DESCRIPTION OF THE DRAWINGS

FIG. 1 is a schematic side sectional view of a synchronizing mechanism.

FIG. 2 is a schematic side sectional view of the sliding action of a coupling sleeve.

FIG. 3 is an schematic exploded perspective view of a synchronizing mechanism.

FIG. 4 is a schematic plan view of the synchronization of a synchronizing mechanism.

FIG. 5 is a schematic front sectional view of a synchronizing mechanism.

DESCRIPTION OF NOTATIONS

1 Synchronizing mechanism (Transmission)
2 Input shaft
3 Synchro-hub
4 Insert-shifting keys
5 Coupling sleeve
6 Synchro-springs

PREFERRED EMBODIMENT

Figure 1:
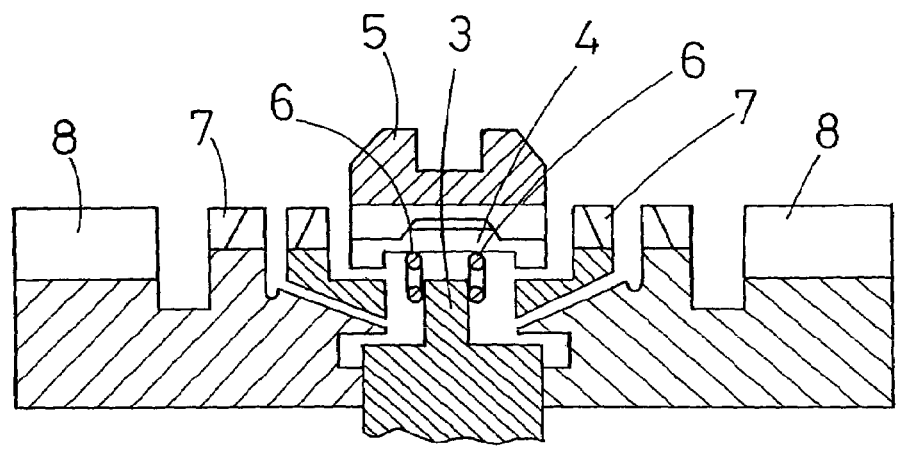
FIGS. 1 to 5 show an embodiment of this invention.
Figure 2:
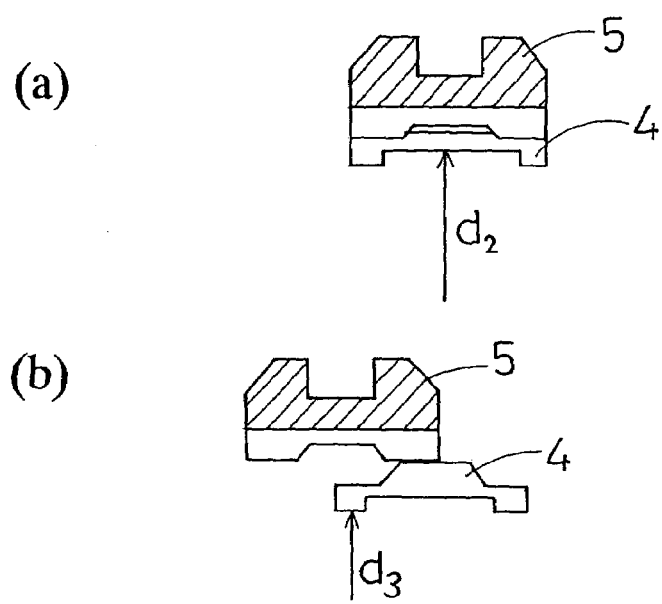
Figure 3:
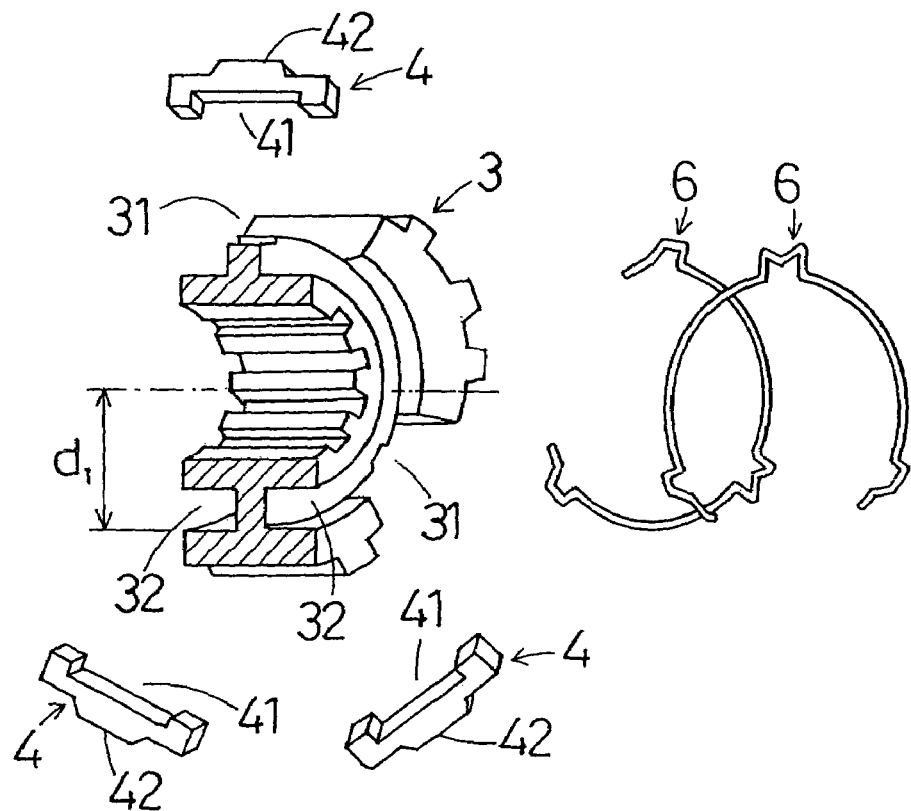
Figure 3:
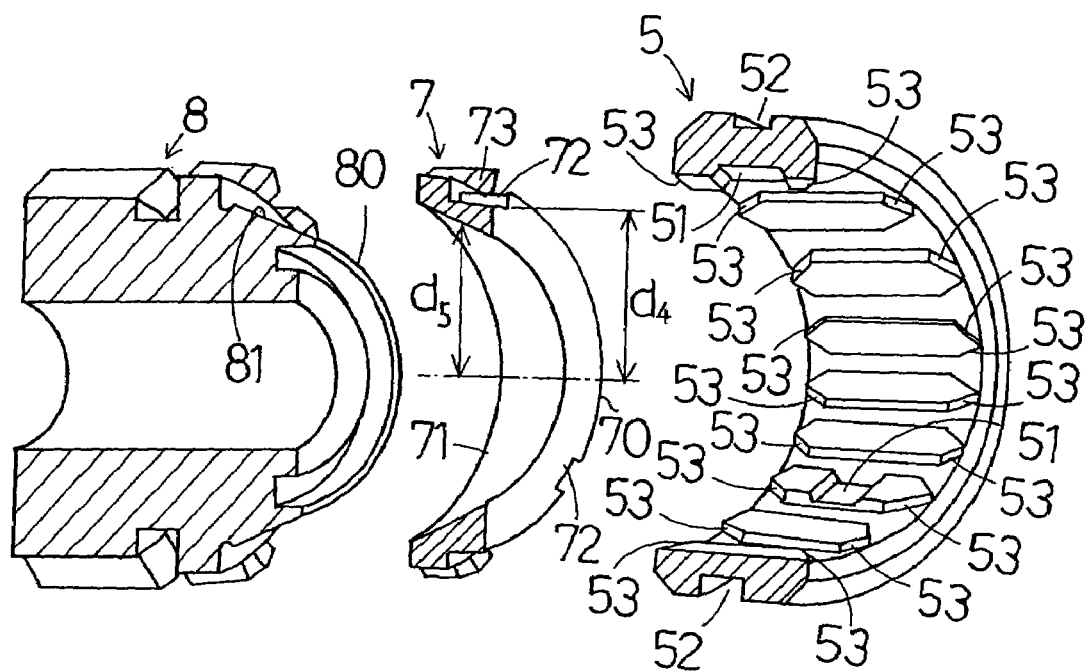
Figure 4:
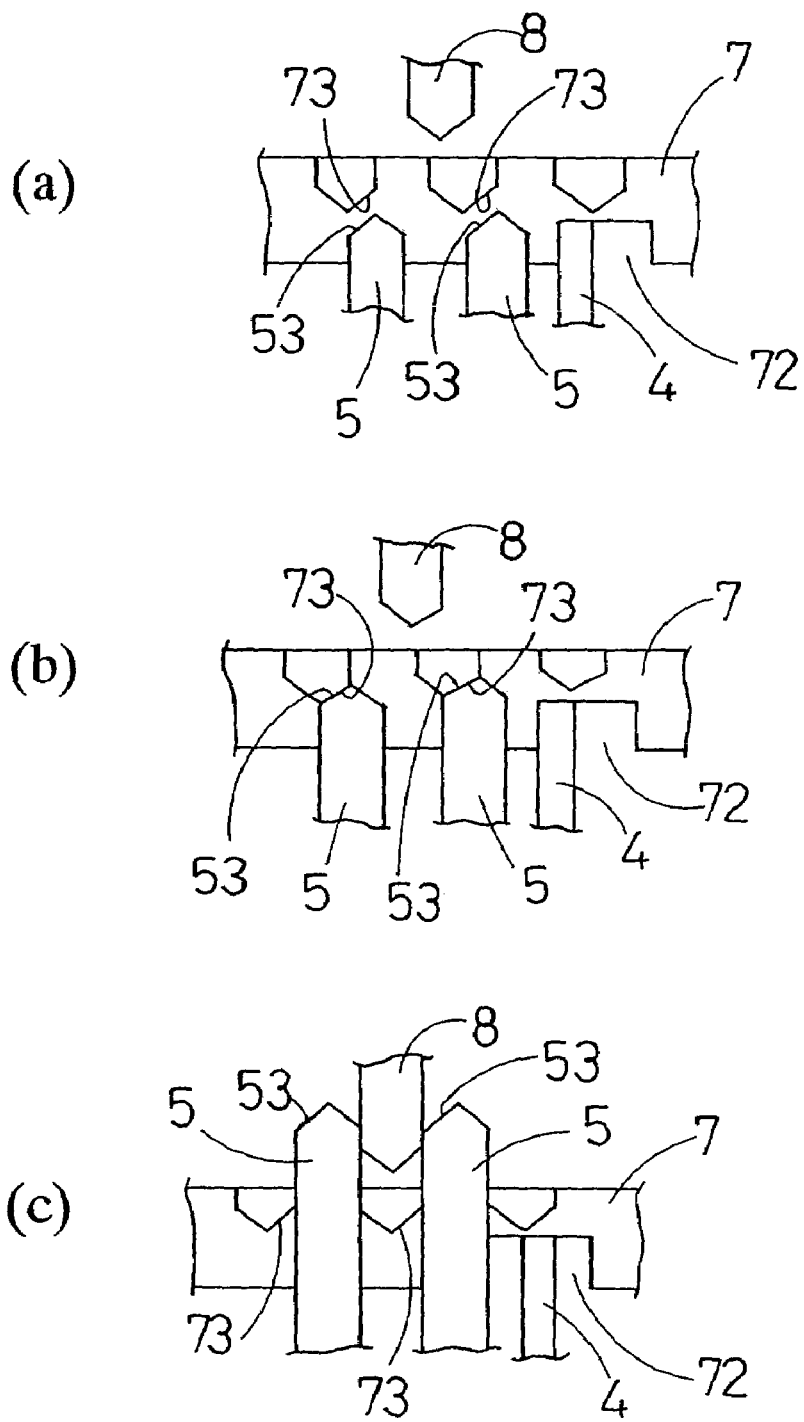
Figure 5:
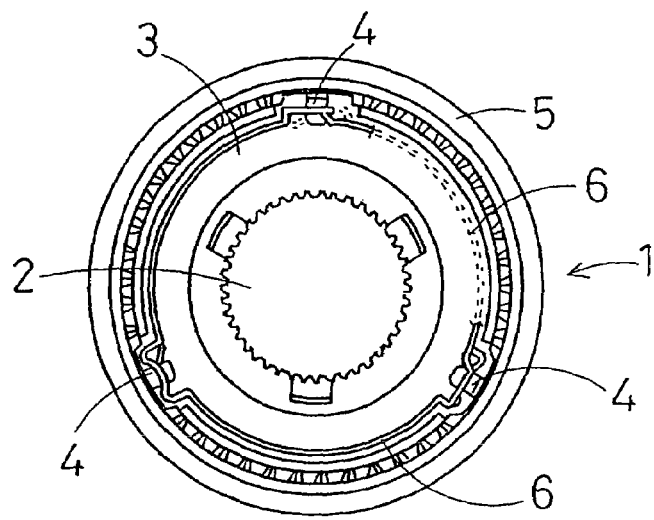

FIG. 1 to 5 show an embodiment of the present invention. In this embodiment, synchro-springs (6,6) having a convex part as shown in FIG. 3 and FIG. 5 are used for a synchronizing mechanism (1) of an automobile transmission.

As shown in FIGS. 1 to 5, a synchronizing mechanism (1) of this embodiment comprises an input shaft (2) which is a spline shaft, a synchro-hub (3) which is put on said input shaft (2) and has three key attachment notches (31,31) on the outer surface, three insert-shifting keys (4,4) which are fitted into said key attachment notches (31,31) of said synchro-hub (3) respectively, a coupling sleeve (5) which is slidably put on said synchro-hub (3) and has three key fitting recesses (51,51) formed on said coupling sleeve's (5) inner surfaces to fit said insert-shifting keys (4,4) respectively therein, a pair of synchro-springs (6,6) which act to guide said insert-shifting keys (4,4) toward said coupling sleeve (5), a synchronizer ring (7) which is put on said input shaft (2) adjacent to said synchro-hub (3) and has a boss part (70)

which has a cone shaped inner surface (71), and a synchronized gear (8) which is put on said input shaft (2) adjacent to said synchronizer ring (7) and has a boss part (80) which has a cone shaped friction surface (81) on the outer surface contacting with the inner surface (71) of said synchronizer ring (7).

On the outer surface of said synchro-hub (3), three key attachment notches (31,31) and splines are formed, and on the inner surface of said synchro-hub (3), splines which engage with the splines of said input shaft (2), for said synchro-hub (3) to be put on said input shaft (2), are formed. And on the both sides of said synchro-hub (3), grooves (32,32) are formed, and then said synchro-hub (3) has I-shaped form in the cross section.

On the inner surface of said insert-shifting keys (4,4), spring holding recesses (41,41) for hooking and stopping said synchro-springs (6,6) are formed, and on the outer surface of said insert-shifting keys (4,4), fitting convex parts (42,42) to fit in said key fitting recesses (51,51) of said coupling sleeve (5) are formed.

On the inner surface of said coupling sleeve (5), key fitting recesses (51,51) in which said insert-shifting keys (4,4) are fitted and splines which engage with the splines of said synchro-hub (3), for said coupling sleeve (5) to be fitted slidably on said synchro-hub (3), are formed, and on the outer surface of said coupling sleeve (5), a fork groove (52) is formed wherein a shift fork (not shown in the Fig.) used to slide axially said coupling sleeve (5) is fitted. Further, on the side of the spline convex parts of the inner surface of said coupling sleeve (5), chamfers (53,53) are formed.

In this embodiment, the whole shape of said synchro-springs (6,6) is C-shaped, and the both end portions and the center portion of said synchro-springs (6,6) which come into contact with insert-shifting keys (4,4) are shaped into convex forms respectively.

Said synchro-springs (6,6) are respectively fitted into grooves (32,32) on the both sides of said synchro-hub (3), and elastically stretch to come into contact with said spring holding recesses (41,41) of the inner parts of said insert-shifting keys (4,4), and then act to guide said insert-shifting keys (4,4) toward said coupling sleeve (5) by the elastic force of said synchro-springs (6,6).

In this embodiment, said pair of synchro-springs (6,6) are put respectively into the grooves (32,32) on both sides of said synchro-hub (3), the relative position of said pair of synchro-springs (6,6) mutually deviating at an angle of 120 degree.

Said synchronizer ring (7) is put on said input shaft (2) adjacent to said synchro-hub (3) and has a boss part (70) which has a tapering cone shaped inner surface (a friction surface) (71), the diameter of said boss part expanding gradually toward said synchronized gear (8). On the outer surface of said boss part (70), key grooves (72,72) in which said insert-shifting keys (4,4) are put, are formed, and on the outer surface of said synchronizer ring (7), splines which engage with the splines of the inner surface of said coupling sleeve (5), for said synchronizer ring (7) to be put slidably on said coupling sleeve (5), are formed. Further, on the both sides of the spline convex parts of the outer surface of said synchronizer ring (7), chamfers (73,73) are formed. In this embodiment, the width of said key grooves (72,72) of said synchronizer ring (7) is settled to be larger than the width of said insert-shifting keys (4,4).

Said synchronized gear (8) is put on said input shaft (2) adjacent to said synchronizer ring (7) and has a boss part (80) which has a cone shaped friction surface (81) on the outer surface, said boss part (80) being tapered along the inner surface (71) of said synchronizer ring (7), and on the outer surface of said synchronized gear (8), splines which engage with the splines of the inner surface of said coupling sleeve (5), for said synchronized gear (8) to be put slidably on said coupling sleeve (5), are formed.

In the case of gear shifting by using above-mentioned transmission (synchronizing mechanism) (1), a coupling sleeve (5) is slid toward a synchronizer ring (7) (toward a synchronized gear (8)) with a shift fork (not shown in the Fig.), so that said insert-shifting keys (4,4) which are guided toward said coupling sleeve (5) by synchro-springs (6,6) are slid toward said synchronizer ring (7) (toward said synchronized gear (8)) together with said coupling sleeve (5), and said synchronizer ring (7) is slid toward said synchronized gear (8) by said insert-shifting keys (4,4) which are put in said key grooves (72,72) of said synchronizer ring (7). As a result, a first synchronization starts by contacting said inner surface (friction surface) (71) of said synchronizer ring (7) with said outer surface (friction surface) of said synchronized gear (8) as shown in FIG. 4.

When the first synchronization starts, said synchronizer ring (7) rotats at an anguale corresponding to the space of said key grooves (72,72) by the friction torque generated as a result of the friction caused by said friction surfaces (71,81) coming into contact, and then the chamfers (53,53) of said coupling sleeve (5) and the chamfers (73,73) of said synchronizer ring (7) are set at a face-to-face position.

When said coupling sleeve (5) further slides, said chamfers (53,53) of said coupling sleeve (5) come into contact with chamfers (73,73) of said synchronizer ring (7) to act to guide toward said synchronized gear (8) by said chamfers (53,53) of said coupling sleeve (5), so that a synchronization between said synchronized gear (8) and said coupling sleeve (5) (and said synchronizer ring (7)) starts.

When a synchronization between said synchronized gear (8) and said coupling sleeve (5) (and said synchronizer ring (7)) is completed, the friction torque which has been generated between the friction surfaces (71,81) vanishes, and said synchronizer ring (7) rotates as a result of the dividing torque generated between chamfers (53,73), so that the splines of said coupling sleeve (5) slides through the splines of said synchronizer ring (7) engaging with each other, to engage with the splines of said synchronized gear (8), and then the gear change is completed.

As described above, by shaping convex forms at the both end portions and the center portion of said synchro-springs (6,6) which come into contact with said insert-shifting keys (4,4), $d_2$ can be settled to be larger than $d_1$ ($d_1<d_2$), so that $d_2$, $d_3$, $d_4$ and $d_5$ can be settled to be much larger. That is, it becomes possible to enlarge a capacity of a synchronizer ring (7) without increasing the size of the transmission by changing from a single-cone to a multi-cone synchronizing mechanism.

Figure 6:
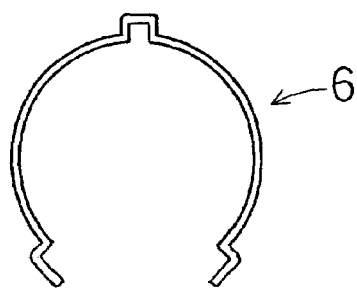
FIG. 6 is a perspective view of synchro-springs in other embodiments.
Figure 6:
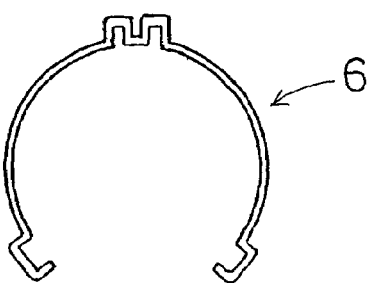
Figure 7:
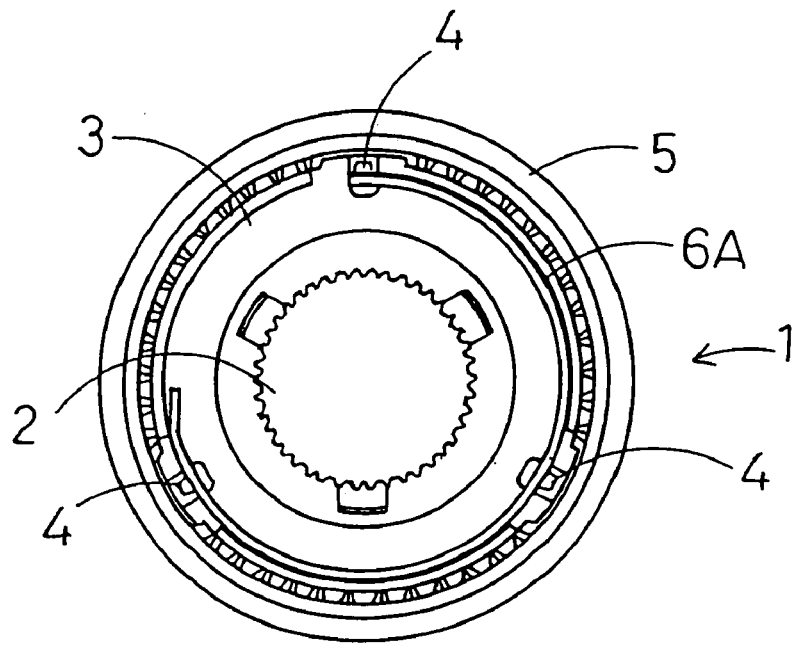
FIG. 7 is a schematic front sectional view of the synchronizing mechanism described in the prior art.
Figure 8:
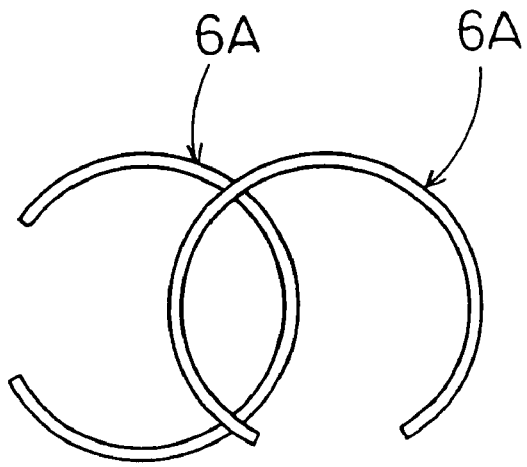
FIG. 8 is a plan view of a synchro-spring as described in the prior art.

Besides this embodiment, the both end portions and the center portion of said synchro-springs (6,6) which come into contact with said insert-shifting keys (4,4) may take the form shown in FIG. 6, and said forms may be combined. Further, more than three insert-shifting keys (4,4) may be employed.

FIELD OF THE INDUSTRIAL USE

In this invention, it becomes possible to ensure that a synchronizer ring has sufficient capacity without increasing the size of the synchronizing mechanism, and when this synchronizing mechanism is used for an automobile transmission, smooth gear shifting is attained, and excellent operability can be acquired.

What is claimed is:

1. A synchronizing mechanism comprising a synchro-hub put on an input shaft, a plural number of insert-shifting keys attached on the outer surface of said synchro-hub, a coupling sleeve slidably put on said synchro-hub, and synchro-springs which resiliently push said plural number of insert-shifting keys toward said coupling sleeve, and have convex forms radially outwardly projecting respectively in the portions which come into contact with said plural number of insert-shifting keys, wherein said synchro-springs resiliently push said plural number of insert-shifting keys toward said coupling sleeve even if said coupling sleeve is in such a position that a distance from the inner surface of spring holding recesses of said plural number of insert-shifting keys to the center of said input shaft is larger than a radius of grooves of said synchro-hub.

* * * * *